United States Patent Office 3,025,309
Patented Mar. 13, 1962

3,025,309
Δ²-ANDROSTENE AND ETIOCHOLENE COMPOUNDS AND PROCESS FOR PREPARING SAME
Giangiacomo Nathansohn, Milan, Italy, assignor to Lepetit, S.p.A., Milan, Italy
No Drawing. Filed Aug. 2, 1960, Ser. No. 46,899
Claims priority, application Great Britain Aug. 7, 1959
8 Claims. (Cl. 260—397.4)

This invention is concerned with new steroids and processes for the production thereof.

The invention consists in steroids of the following structural formula

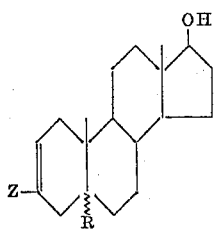

wherein Z represents a cyano or an acyl radical, R represents an alpha-hydrogen or a beta-hydrogen atom.

The steroids of the invention have been found to be highly active as anti-oestrogenic agents.

According to the process which forms a further feature of the invention, a steroid of the formula

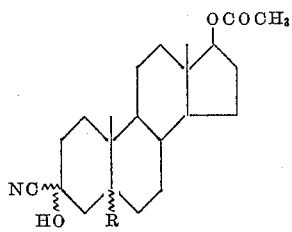

wherein R has the above significance, is converted into the corresponding steroid lacking the 3-OH group and having a double bond between the positions 2 and 3, by dehydration with phosphorus oxychloride in a basic medium such as pyridine, pyridine bases, quinoline, a tertiary amine etc. at the boiling temperature of this basic medium.

The 3-cyanosteroid obtained is then reacted with an alkyl magnesium halide, preferably iodide or bromide, in a solvent at the boiling temperature of the solvent. It is preferred to carry out this reaction in an ether such as diethyl ether, tetrahydrofuran, dioxane or anisol, preferably at a temperature below 70° C., although higher temperatures still give good results. The formed 3-ketoimines are not separated but are split with dilute mineral acids into the corresponding 3-acylsteroids.

The invention is illustrated by the following examples.

Example 1

A mixture of 9.5 g. of androstane-3-cyano-3,17beta-diol-17beta-acetate, prepared according to Helv. Chim. Acta 26, 288 (1943), 20 ml. of phosphorus oxychloride and 200 ml. of pyridine is refluxed for 4 hours. The cooled solution is then poured into 1200 ml. of ice cooled dilute hydrochloric acid. The precipitate is collected after prolonged standing, washed with water, dried, dissolved in benzene and filtered through a column of alumina. The filtrate is concentrated to about 50 ml. and diluted with 70 ml. of water petroleum ether. The white precipitate is collected and dried giving 5.7 g. (76%) of 2-androstene-3-cyano-17beta-acetate. M.P. 145–147° C.

This compound, when recrystallized from methanol, shows M.P. 147.5–148° C.; $[\alpha]_D^{18}+54.89°$. An elemental analysis gave C, percent, 77.23, H, percent, 9.16, N, percent, 4.02. Calculated for $C_{22}H_{31}NO_2$, C, percent, 77.37, H, percent, 9.15, N, percent, 4.10.

A solution of 1.5 g. of 2-androstene-3-cyano-17beta-ol-17beta-acetate in 120 ml. of 4% solution of potassium hydroxide in 50% aqueous methanol is refluxed for 2 hours. Most of the methanol is evaporated in vacuo, then the mixture is diluted with water, made acidic with dilute hydrochloric acid, the precipitate collected and dried. Yield 1.35 g. of 2-androstene-3-cyano-17beta-ol, M.P. 83–99° C.

To a solution of 0.8 g. of 2-andostene-3-cyano-17beta-ol in 30 ml. of anhydrous tetrahydrofuran 70 ml. of a 36% solution of methylmagnesium bromide in tetrahydrofuran are added and the mixture is warmed at 64–68° C. for 6 hours. The mixture is then cautiously added to 70 ml. of 20% hydrochloric acid with external cooling. After one night at room temperature most of the solvent is removed in vacuo, the residue is diluted with water and extracted with ethyl ether. The solvent is distilled off, the residue is dissolved in benzene and filtered through alumina. After evaporation of the solvent the residue is recrystallized from 40% ethanol. M.P. 157–159° C.; $[\alpha]_D^{18}+94.76°$ (c. 1, chloroform). An elemental analysis gave C, percent, 79.65, H, percent, 10.10; for $C_{21}H_{32}O_2$ calculated C, percent, 79.69, H, percent, 10.19. The product is 2-androstene-3-acetyl-17beta-ol.

Example 2

Ten grame of finely powdered etiocholane-17beta-ol-3-one-17beta-acetate (prepared according to Zeitschrift für Physiologische Chemie 248, 205, 1937) in 60 ml. of acetone cyanohydrin are gently warmed for about 2 minutes and then allowed to stand for 3 hours at room temperature in the darkness. The mixture is poured into 500 ml. of water and the precipitate of etiocholane-3-cyano-3,17beta-diol-17beta-acetate is collected and washed with water. Yield 10.5 g., M.P. 141–142° C. The analysis gave C, percent 73.37, H, percent, 9.23, N, percent, 3.91; for $C_{22}H_{33}NO_3$ calculated C, percent, 73.50, H, percent, 9.25, N, percent, 3.90.

A mixture of 10.5 g. of etiocholane-3-cyano-3,17beta-diol-17beta-acetate, 20 ml. of phosphorus oxychloride and 200 ml. of anhydrous pyridine is refluxed for 4 hours, then the solution is poured into a mixture of 750 ml. of water and 200 ml. of concentrated hydrochloric acid with external cooling. After one night the precipitate is collected and dried, dissolved in 200 ml. of anhydrous benzene, filtered through alumina, the solvent is concentrated to about 50 ml. and the residue is treated with 70 ml. of warm petroleum ether. The white crystalline precipitate of 2-etiocholene-3-cyano-17beta-ol-17beta-acetate is collected and recrystallized from ethanol. M.P. 200–201° C.; $[\alpha]_D^{18}+3.72$ (c. 1, chloroform). The analysis gave C, percent, 77.4, H, percent, 9.18, N, percent 4.40; for $C_{22}H_{31}NO_2$ calculated C, percent, 77.37, H, percent, 9.15, N, percent, 4.10.

The above acetate is converted into the free alcohol by refluxing it with 4% potassium hydroxides as described in Example 1. Yield nearly quantitative. M.P. 170–172° C. (ethanol).

To a solution of 1.5 g. of 2-etiocholene-3-cyano-17beta-ol in 60 ml. of tetrahydrofuran 140 ml. of a 36.5% solution of methylmagnesium bromide in tetrahydrofuran is added and the mixture is warmed at 65–70° C. for 6 hours. The mixture is then poured into 150 ml. of 20% hydrochloric acid and allowed to stand overnight.

Most of the solvent is distilled off and 300 ml. of water are added. The precipitate is collected, washed and recrystallized from a small amount of methanol. Yield 0.71 g. (48%) of 2-etiocholene-3-acetyl-17beta-ol, M.P.

168–169° C. $[\alpha]_D^{18} +26.2°$ (c. 1, chloroform). An analysis gave C, percent, 79.59, H, percent, 10.08; for $C_{21}H_{32}O_2$ calculated C, percent, 79.69, H, percent, 10.19.

What I claim is:

1. A steroid of the formula

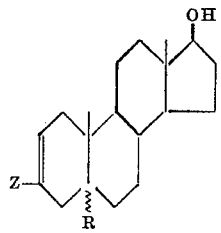

wherein Z is a member of the class consisting of cyano and acetyl groups, and R is a member of the class consisting of alpha-hydrogen and beta-hydrogen.

2. 2-androstene-3-acetyl-17beta-ol.
3. 2-etiocholene-3-acetyl-17betal-ol.
4. 2-androstene-3-cyano-17beta-ol.
5. 2-etiocholene-3-cyano-17beta-ol.
6. A process for preparing a steroid of the formula

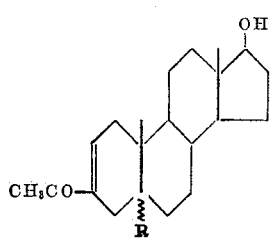

wherein R is a member of the class consisting of alpha-hydrogen and beta-hydrogen, which comprises dehydrating a steroid of the formula

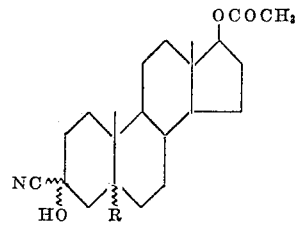

wherein R has the above significance, with phosphorus oxychloride in a basic medium at the boiling temperature of said medium, hydrolyzing the product under basic conditions to replace the 17β-acetyl group with hydroxyl, reacting the obtained 2-androstene-3-cyano-17beta-ol with a methyl magnesium halide in a solvent and treating the reaction mixture with a strong mineral acid.

7. A process as in claim 6, wherein the basic medium is pyridine.

8. A process as in claim 6, wherein the strong mineral acid is hydrochloric acid.

References Cited in the file of this patent

UNITED STATES PATENTS

| | | |
|---|---|---|
| 2,247,822 | Schwenk | July 1, 1941 |
| 2,833,792 | Dodson | May 6, 1958 |
| 2,935,519 | Ercoli | May 3, 1960 |